US011119322B2

(12) United States Patent
Guan et al.

(10) Patent No.: US 11,119,322 B2
(45) Date of Patent: Sep. 14, 2021

(54) IMAGING DISPLAY SYSTEM (71) Applicant: YUTOU TECHNOLOGY (HANGZHOU) CO., LTD., Hangzhou (CN)

(72) Inventors: Liang Guan, Hangzhou (CN); Kun Li, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 24 days.

(21) Appl. No.: 16/626,304

(22) PCT Filed: Jan. 26, 2018

(86) PCT No.: PCT/CN2018/074341
§ 371 (c)(1),
(2) Date: Dec. 23, 2019

(87) PCT Pub. No.: WO2018/233293
PCT Pub. Date: Dec. 27, 2018

(65) Prior Publication Data
US 2021/0149199 A1    May 20, 2021

(30) Foreign Application Priority Data
Jun. 23, 2017 (CN) .......................... 201710484635.7

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/014* (2013.01); *G02B 2027/0141* (2013.01)

(58) Field of Classification Search
CPC .......................... G02B 27/0172; G06T 19/006
(Continued)

(56) References Cited

U.S. PATENT DOCUMENTS 5,751,682 A * 5/1998 Hasegawa ............ G11B 7/1353
369/103
5,911,616 A * 6/1999 Levine .................... H01J 9/241
445/52
(Continued)

FOREIGN PATENT DOCUMENTS

CN        102213831 A      10/2011
CN        103837988 A       6/2014
(Continued)

OTHER PUBLICATIONS

CN 201710484635.7, Official Action dated Feb. 6, 2020, 12 pages of English translation and 9 pages of Official Action.
(Continued)

*Primary Examiner* — Prabodh M Dharia
(74) *Attorney, Agent, or Firm* — Getech Law LLC; Jun Ye (57) ABSTRACT

An imaging display system in the field of augmented reality technology comprises a waveguide structure (14) disposed on an outer surface of an exit surface (7) of a polarization beam splitter (3) of an optical engine module (A). The waveguide structure is tubular. One end (15) of the waveguide structure is connected to the exit surface and together with the exit surface forms a preset angle (α). The other end of the waveguide structure is a free end. The imaging display system expands an eye motion box (EMB) by means of the waveguide structure. The preset angle formed between the waveguide structure and the exit surface causes light (22) incident on the waveguide structure to undergo total internal reflection inside the waveguide structure. The waveguide structure further comprises a plurality of semi-transmissive and semi-reflective lenses (18) disposed obliquely in order inside the waveguide structure, and the light incident into the waveguide structure is reflected on the surface of each of the lenses such that the light is uniformly released into viewer's
(Continued)

eyes. The imaging display system can realize more compact applications in AR optical systems and provide a larger field of view (FOV) and eye motion box for users.

16 Claims, 4 Drawing Sheets

(58) Field of Classification Search
USPC .................. 345/8; 359/625, 567; 362/612; 369/103; 445/52
See application file for complete search history.

(56) References Cited

U.S. PATENT DOCUMENTS

| | | | | |
|---|---|---|---|---|
| 6,398,363 B1* | 6/2002 | Ho | .................. | G03B 21/208 |
| | | | | 348/742 |
| 6,628,355 B1* | 9/2003 | Takahara | ............. | G09G 3/3648 |
| | | | | 349/106 |
| 8,556,490 B1* | 10/2013 | Bohler | .................... | G09F 13/04 |
| | | | | 362/612 |
| 2002/0057496 A1* | 5/2002 | Kanai | ................. | G02B 23/2453 |
| | | | | 359/625 |
| 2008/0037088 A1* | 2/2008 | Sako | .................... | G03H 1/0486 |
| | | | | 359/35 |
| 2009/0201787 A1* | 8/2009 | Ogasawara | .......... | G11B 7/1378 |
| | | | | 369/112.23 |
| 2010/0277803 A1* | 11/2010 | Pockett | .............. | G02B 27/0081 |
| | | | | 359/567 |
| 2011/0248905 A1 | 10/2011 | Chosokabe et al. | | |
| 2016/0259167 A1 | 9/2016 | Takagi et al. | | |
| 2017/0153866 A1* | 6/2017 | Grinberg | ............... | G02B 27/017 |
| 2017/0235133 A1* | 8/2017 | Border | .................... | G06F 3/005 |
| | | | | 345/8 |
| 2018/0045962 A1 | 2/2018 | Inagaki | | |
| 2018/0372956 A1* | 12/2018 | Chen | .................... | G02B 6/4214 |

FOREIGN PATENT DOCUMENTS

| | | |
|---|---|---|
| CN | 103837988 A | 6/2014 |
| CN | 104656259 B | 5/2015 |
| JP | 2016161797 A | 9/2016 |
| WO | 2016147868 A1 | 9/2016 |

OTHER PUBLICATIONS

PCT/CN2018/074341—International Search Report, dated Apr. 26, 2018, with English translation, 6 pages.
PCT/CN2018/074341—Written Opinion, dated Apr. 26, 2018, with English translation, 5 pages.

* cited by examiner

IMAGING DISPLAY SYSTEM

FIELD OF THE INVENTION

The present invention relates to the field of augmented reality imaging technology, in particular to an imaging display system.

BACKGROUND OF THE INVENTION

With the development of Augmented Reality (AR) technology, the market of portable and wearable devices applied to AR technology is also growing rapidly. Among many hardware implementations using the AR technology, Helmet-Mounted Displays (HMDs) and Near-to-Eye Display (NEDs) are the most effective implementations that can provide users with optimal experience.

The HMD similar to glasses may also be referred to as a glasses-type display or video glasses, and is capable of sending optical signals to the eyes through various helmet-mounted display devices to achieve different display effects in the AR technology.

The NED is an HMD capable of projecting an image directly into the viewer's eyes. The display screen of the NED is within 10 cm from human eyeballs. Such a close image is usually invisible to human eyes. However, the image can be focused to the retinas of the human eyes by a specific lens array designed in an NED optical system, and processed by the visual nervous system, so that a virtual large-format image can be presented in front of the user's eyes, and various different display effects of the AR technology can be realized.

In optical combiners, waveguide technology is increasingly popular due to its ability to implement ultra-thin NED structures with large Field of View (FOV). In addition to the large FOV and compactness, a grating inside a waveguide is also used to increase the size of an exit pupil of the display, so the display is often referred to as an Exit Pupil Expander (EPE). EPE elements are generally classified into a reflection grating type and a diffraction grating type. The present invention focuses on, among other applications, the design and manufacture of optical systems for HMD and NED. Large FOV, large EPE and compactness are major concerns in the present invention, and are achieved by the compact design of lighting and imaging optical devices and the use of a reflective waveguide as an EPE.

In the prior art, an optical system of an NED is taken as an example, generally including a lighting device (light source), various optical devices for imaging, and an optical combiner. In the lighting device, a micro display may provide images through an active display of an Organic Light-Emitting Diode (OLED) panel, or provide images indirectly by means of illumination of different forms of Spatial Light Modulators (SLMs), and pixels displayed by the micro display may be imaged to an infinite distance by the imaging optical devices, and then transmitted to the viewer's eyes by the optical combiner. With the improvement of FOV, the hardware devices of the conventional optical combiner are larger and bulkier, and at the same time, the Eye Motion Box (EMB) of the device is narrower, which affects the user's comfort of wearing and viewing. Many studies on the above problems have been started in the prior art, but the hardware devices implemented in these studies are not compact enough to meet the requirements of HMD or NED, and the implementation of these hardware devices requires very complicated design and manufacturing processes.

SUMMARY OF THE INVENTION

According to the above problems in the prior art, a technical solution of an imaging display system is provided, which aims to implement a smaller and more compact optical system applied to augmented reality so as to provide a larger field of view and eye motion box for users.

The technical solution specifically includes:

An imaging display system, applied to augmented reality technology, wherein the imaging display system is provided with an optical engine module including a polarization beam splitter for splitting incident light into two types of polarized light and simultaneously emitting the polarized light from an exit surface of the optical engine module;

a waveguide structure is disposed on an outer surface of the exit surface of the optical engine module, the waveguide structure is tubular, one end of the waveguide structure is connected to the exit surface and together with the exit surface forms a preset angle, the other end of the waveguide structure is a free end, and the imaging display system diffuses an eye motion box of the imaging display system through the waveguide structure;

the preset angle formed between the waveguide structure and the exit surface causes the light incident on the waveguide structure to undergo total internal reflection inside the waveguide structure;

the waveguide structure further includes:

a plurality of semi-transmissive and semi-reflective lenses disposed obliquely in order inside the waveguide structure, the light incident into the waveguide structure being reflected on the surface of each of the lenses such that the light is uniformly released into viewer's eyes.

Preferably, in the imaging display system, the two types of polarized light include S polarized light and P polarized light.

Preferably, in the imaging display system, the angle between the waveguide structure and the exit surface causes the light emitted from the exit surface to reach a top surface and a bottom surface of the waveguide structure at angles greater than a critical angle;

a triangular prism is disposed between the waveguide structure and the exit surface, and the shape of the triangular prism matches the preset angle between the waveguide structure and the exit surface;

an outer surface of the triangular prism is coated with a light-absorbing material.

Preferably, in the imaging display system, an entrance pupil of light emitted from the exit surface and incident into the waveguide structure is completely included in the waveguide structure.

Preferably, in the imaging display system, a triangular prism is disposed between the waveguide structure and the exit surface, and the shape of the triangular prism matches the angle between the waveguide structure and the exit surface;

an outer surface of the triangular prism is coated with a reflective material;

the angle between the waveguide structure and the exit surface causes the light reflected from the outer surface of the triangular prism into the waveguide structure to reach the top surface and the bottom surface of the waveguide structure at angles greater than the critical angle, respectively.

Preferably, in the imaging display system, an entrance pupil of light emitted from the exit surface and incident into the waveguide structure is included in the triangular prism.

Preferably, in the imaging display system, a lighting portion of the optical engine module includes a light splitting surface and a light source array, and the light splitting surface is disposed obliquely relative to the light source array;

a first type of polarized light in the polarized light emitted from the light source array is transmitted through the light splitting surface and emitted from the exit surface of the optical engine module;

a second type of polarized light in the polarized light emitted from the light source array is reflected 90 degrees by the light splitting surface and emitted;

the light source array is disposed parallel to the optical path of the second type of polarized light reflected by the light splitting surface;

the first type of polarized light is S polarized light, and the second type of polarized light is P polarized light; or the first type of polarized light is P polarized light, and the second type of polarized light is S polarized light.

Preferably, in the imaging display system, the light source array is a polarized light emitter.

Preferably, in the imaging display system, the light source array is a non-polarized light emitter;

a linear polarizer is disposed between the light source array and the light splitting surface to convert the light emitted by the light source array into polarized light.

Preferably, in the imaging display system, an incident surface is further provided in the lighting portion, and the incident surface is disposed between the light source array and the light splitting surface and is parallel to the light source array;

the light source array is attached to the incident surface through a mechanical housing.

Preferably, in the imaging display system, a display portion of the optical engine module includes:

a micro display disposed perpendicular to the light path of the second type of polarized light reflected by the light splitting surface, the light emitted from the light source array being reflected by the light splitting surface and then imaged and displayed on the micro display;

the micro display is also used to reflect the second type of polarized light and then convert the same into the first type of polarized light, and to transmit the first type of polarized light through the light splitting surface.

Preferably, in the imaging display system, the micro display is a display capable of rotating the polarization of reflected light.

Preferably, in the imaging display system, the micro display is a display that cannot rotate the polarization of reflected light;

a first quarter-wave plate is disposed between the micro display and the light splitting surface for rotating the polarization of reflected light.

Preferably, in the imaging display system, a first reflective surface is provided in the optical engine module, and the first reflective surface is disposed between the micro display and the light splitting surface and is parallel to the micro display;

the micro display is attached to the first reflective surface through a mechanical housing.

Preferably, in the imaging display system, the optical engine module further includes:

a collimating lens disposed perpendicular to the optical path of the second type of polarized light reflected by the light splitting surface and located on two sides of the light splitting surface together with the micro display, the collimating lens being used to stretch the imaging distance of pixels on the micro display; and a second quarter-wave plate disposed between the collimating lens and the light splitting surface for rotating the polarization of reflected light.

Preferably, in the imaging display system, a second reflective surface is provided between the second quarter-wave plate and the light splitting surface;

the collimating lens and the second quarter-wave plate are attached to the second reflective surface through a mechanical housing.

Preferably, in the imaging display system, the polarization beam splitter in the optical engine module is used to split incident light into two types of polarized light and emit the polarized light from the exit surface of the optical engine module;

the polarization beam splitter is formed by a combination of a first right-angle prism and a second right-angle prism;

the first right-angle prism includes an incident surface and a first reflective surface perpendicular to each other;

the second right-angle prism includes a second reflective surface and the exit surface perpendicular to each other;

the first right-angle prism is below the second right-angle prism;

the oblique surface of the first right-angle prism and the oblique surface of the second right-angle prism are bonded to form a light splitting surface;

the light splitting surface is used to transmit a first type of polarized light in the light source, and to reflect a second type of polarized light in the light source.

Preferably, in the imaging display system, the oblique surface of the first right-angle prism and the oblique surface of the second right-angle prism are glued to form the light splitting surface.

The above technical solution has the beneficial effects: provided is an imaging display system, which can realize more compact applications in optical systems of augmented reality and provide a larger field of view and eye motion box for users.

DETAILED DESCRIPTION OF EMBODIMENTS

A clear and complete description will be made to the technical solutions in the embodiments of the present invention below with reference to the accompanying drawings in the embodiments of the present invention. Apparently, the embodiments described are only part of the embodiments of the present invention, not all of them. All other embodiments obtained by those of ordinary skill in the art based on the embodiments of the present invention without any creative effort shall fall within the protection scope of the present invention.

It should be noted that the embodiments in the present invention and the features in the embodiments can be combined with each other without conflicts.

The present invention will be further illustrated below in conjunction with the accompanying drawings and specific embodiments, but the present invention is not limited thereto.

According to the above problems in the prior art, an imaging display system is provided. The imaging display system is applied to AR technology, especially to a helmet-mounted display and a near-to-eye display in AR technology.

In the imaging display system, an optical engine module is provided, including a lighting portion, a display portion, and an imaging portion. A polarization beam splitter is used to connect the various portions and split incident light into two types of polarized light, and the two types of polarized light are simultaneously emitted from an exit surface of an optical engine module;

A waveguide structure is disposed on an outer surface of the exit surface of the optical engine module, the waveguide structure is tubular, one end of the waveguide structure is connected to the exit surface and together with the exit surface forms a preset angle, the other end of the waveguide structure is a free end, and the imaging display system diffuses an eye motion box of the display system through the waveguide structure;

The preset angle formed between the waveguide structure and the exit surface causes the light incident on the waveguide structure to undergo total internal reflection inside the waveguide structure;

The waveguide structure further includes:

a plurality of semi-transmissive and semi-reflective lenses disposed obliquely in order inside the waveguide structure, the light incident into the waveguide structure being reflected on the surface of each of the lenses such that the light is uniformly released into viewer's eyes.

Figure 1:
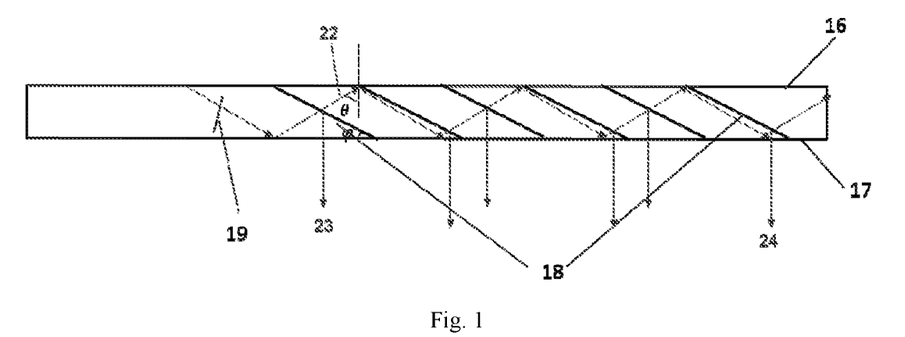
FIG. 1 is a specific structural schematic diagram of a waveguide structure in an imaging display system according to a preferred embodiment of the present invention.

As shown in FIG. 1, the waveguide structure 14 is tubular, and a plurality of semi-transmissive and semi-reflective lenses 18 are disposed obliquely in order inside the waveguide structure 14 to control the light 22 incident into the waveguide structure to be uniformly released into the viewer's eyes from the surface of each lens 18.

In optical combiners, waveguide technology is increasingly popular due to its ability to implement NED structures with large Field of View (FOV). In addition to the large FOV and compactness, a grating inside the waveguide is also used to increase the size of an exit pupil of a display, so the display is often referred to as an Exit Pupil Expander (EPE). EPE elements are usually divided into a reflection grating type and a diffraction grating type. The technical solution of the present invention mainly focuses on large FOV, large EPE and structural compactness, which are achieved by the compact design of lighting and imaging optical devices and the use of a reflective waveguide as an EPE.

Figure 2:
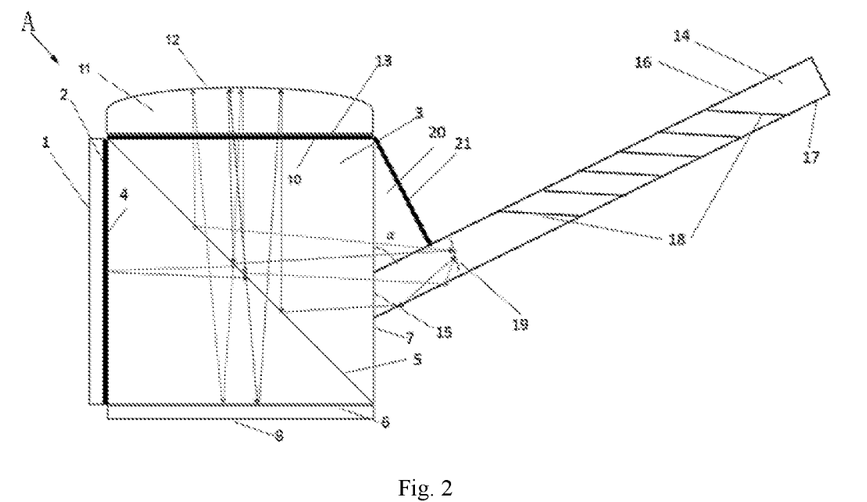
FIG. 2 is a structural schematic diagram of an optical engine module connected to the waveguide structure in the imaging display system according to a preferred embodiment of the present invention.
Figure 3:
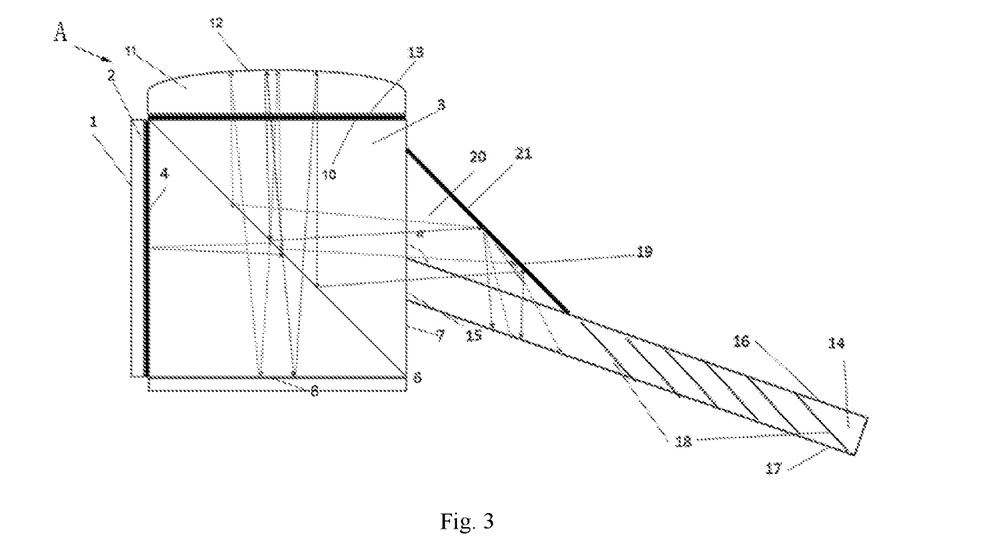
FIG. 3 is a structural schematic diagram of the optical engine module connected to the waveguide structure in the imaging display system according to another preferred embodiment of the present invention.

Specifically, in this embodiment, a plurality of semi-transmissive and semi-reflective lenses 18 is disposed obliquely in order inside the waveguide structure 14. The surfaces of these lenses 18 are coated with films, so that the surface of each lens has certain reflection coefficient for single polarized light (S polarized light or P polarized light, S polarized light in this embodiment). Accordingly, the light 22 is partially reflected and transmitted at each position on the surfaces of the lenses 18 and can be uniformly released into the viewer's eyes. For the design scene of multiple reflection exits, the size of the field of view is proportional to the number of lenses 18, that is, if there are more lenses 18, the field of view is larger. However, when there are more lenses 18, more light is lost. In overall consideration of actual manufacturing cost and effects, it is realistic to design four to six lenses 18 in the waveguide structure 14. A waveguide structure 14 including six lenses 18 is shown in FIGS. 1-3. Furthermore, the angle (p between each lens 18 and a bottom surface 17 of the waveguide structure 14 needs to be calculated and determined based on a critical angle θ, so that the light reflected by the surface of the lens 18 can be released perpendicular to the bottom surface 17 of the waveguide structure 14 to the viewer's eyes, and the released light is imaged on the retinas after passing through the crystalline lenses in the viewer's eyes.

In the waveguide structure 14 designed in the technical solution of the present invention, the size of an Eye Motion Box (EMB) of the entire imaging display system is defined by an innermost beam 23 and an outermost beam 24. Compared with the prior art, the waveguide structure 14 designed in the technical solution of the present invention can expand the exit pupil and then expand the EMB of the imaging display system, so that the imaging display system is more resistant to the imaging effect caused by the viewer's eyeball movement.

In a preferred embodiment of the present invention, the connecting relationship between the waveguide structure 14 and the optical engine module A is shown in FIG. 2 (all components on the left of the waveguide structure 14 in FIG. 2 are included in the optical engine module A, detailed below). The angle α between the waveguide structure 14 and the exit surface 7 of the optical engine module A causes the light emitted from the exit surface 7 to reach a top surface 16 and a bottom surface 17 of the waveguide structure 14 at angles greater than the critical angle θc, respectively.

Still shown in FIG. 2, a triangular prism 20 is disposed between the waveguide structure 14 and the exit surface 7, and the shape of the triangular prism 20 matches the angle α between the waveguide structure 14 and the exit surface 7;

An outer surface 21 of the triangular prism 20 is coated with a light-absorbing material.

Specifically, in this embodiment, one end 15 of the waveguide structure 14 is adhered to the exit surface 7, and a preset angle α is formed between the tubular body of the waveguide structure 14 and the exit surface 7. As shown in FIG. 2, the preset angle α is an acute angle. Further, the preset angle α enables the light emitted from the exit surface 7 to reach the top surface 16 and the bottom surface 17 of the waveguide structure 14 at angles greater than the critical angle θc (the angles greater than the critical angle θc may be referred to FIG. 2), so that the light emitted from the exit surface 7 can undergo Total Internal Reflection (TIR) and be captured in the waveguide structure 14.

Further, for the central light on the main axis, the preset angle α is equal to the incident angle θ of the light. Thus, if the main axis light is to be totally internally reflected, the preset angle α (that is, the incident angle θ of the light) is greater than the critical angle θc. Because the incident light includes multiple beams of light centered on the main axis light, the specific preset angle α needs to be repeatedly adjusted and optimized by simulation software tools to maximize the light collection efficiency as much as possible.

Then, in this embodiment, as shown in FIG. 2, a triangular prism 20 is disposed between the waveguide structure 14 and the output surface 7, and the shape of the triangular prism 20 matches the angle α between the waveguide structure 14 and the output surface 7. The triangular prism 20 is provided to reduce the loss of the light emitted from the exit surface 7. In addition, the outer surface 21 of the triangular prism 20 is coated with a light-absorbing material to prevent stray light from rebounding.

Figure 6:
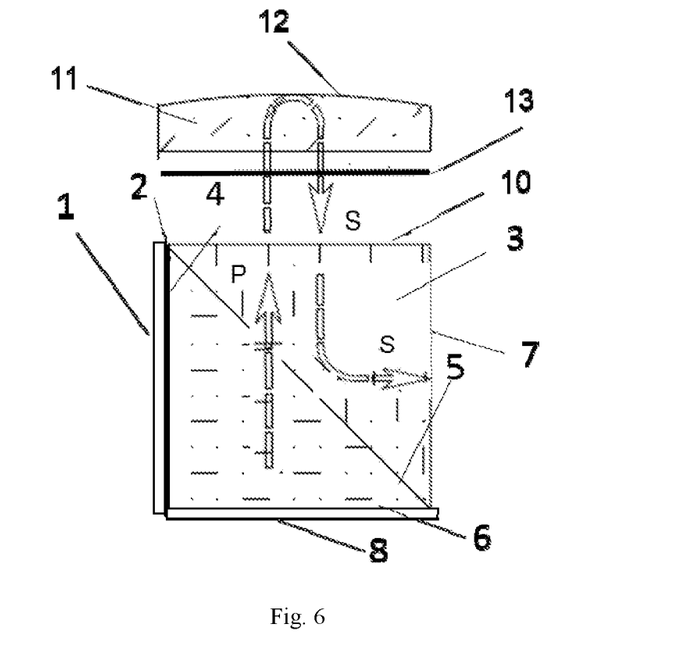
FIG. 6 is a schematic diagram of an imaging portion in the optical engine module according to a preferred embodiment of the present invention.

In this embodiment, in the case of the angle α as shown in FIG. 6, an entrance pupil 19 of the light emitted from the exit surface 7 and incident into the waveguide structure 14 is completely included in the waveguide structure 14, that is, the entrance pupil 19 is completely surrounded by the waveguide structure 14, so that the maximum amount of incident light can be collected. This is completely different from most conventional implementations. In the conventional optical implementations, an optical engine module needs to be placed perpendicular to the waveguide structure 14, so that the light emitted from the polarization beam splitter is incident on the waveguide structure 14 in the direction of a surface normal. Moreover, in order to achieve effective optical coupling, a special coating is applied to the position where the optical engine module 3 intersects the waveguide structure, and a coupling surface is provided inside the entrance of the waveguide structure, so the manufacturing process of the waveguide structure is very complicated. The unique arrangement of the optical engine module and the waveguide structure in this embodiment greatly saves space and simplifies the manufacturing process. In addition, the optical engine module is turned outward to the direction of the eyes, thereby saving the space for glasses legs to accommodate other electronic devices.

In another preferred embodiment of the present invention, as shown in FIG. 3, the waveguide structure 14 and the exit surface 7 form a preset angle α.

Specifically, in this embodiment, one end 15 of the waveguide structure 14 is also adhered to the exit surface 7, and a preset angle α is formed between the tubular body of the waveguide structure 14 and the exit surface 7. Different from the above embodiment, the preset angle α in this embodiment is an obtuse angle (as shown in FIG. 3).

In this embodiment, as shown in FIG. 3, a triangular prism 20 is disposed between the waveguide structure 14 and the exit surface 7, the shape of the triangular prism 20 matches the angle α between the waveguide structure 14 and the exit surface 7, and an outer surface 21 of the triangular prism 20 is coated with a reflective material.

Then, the preset angle α enables the light reflected from the outer surface 21 of the triangular prism 20 into the waveguide structure 14 to reach the top surface 16 and the bottom surface 17 of the waveguide structure 14 at angles greater than the critical angle θc, so that the light incident on the waveguide structure 14 can undergo TIR.

In this embodiment, based on the structural arrangement shown in FIG. 3, the entrance pupil 19 is on the inner wall of the triangular prism 20, instead of being surrounded by the waveguide structure 14.

With the use of the imaging display system (as shown in FIGS. 2-3), the field of view angle is more than 40°, and the eye motion box is more than 10 mm×10 mm, thereby improving the viewing effect and comfortable experience of the user. In a preferred embodiment of the present invention, the lighting portion of the optical engine module includes a light splitting surface and a light source array, and the light splitting surface is disposed obliquely relative to the light source array;

A first type of polarized light in the polarized light emitted from the light source array is transmitted through the light splitting surface and emitted from the exit surface of the optical engine module;

A second type of polarized light in the polarized light emitted from the light source array is reflected 90 degrees by the light splitting surface and emitted;

The light source array is disposed parallel to the optical path of the second type of polarized light reflected by the light splitting surface;

The first type of polarized light is S polarized light, and the second type of polarized light is P polarized light; or The first type of polarized light is P polarized light, and the second type of polarized light is S polarized light.

Figure 4:
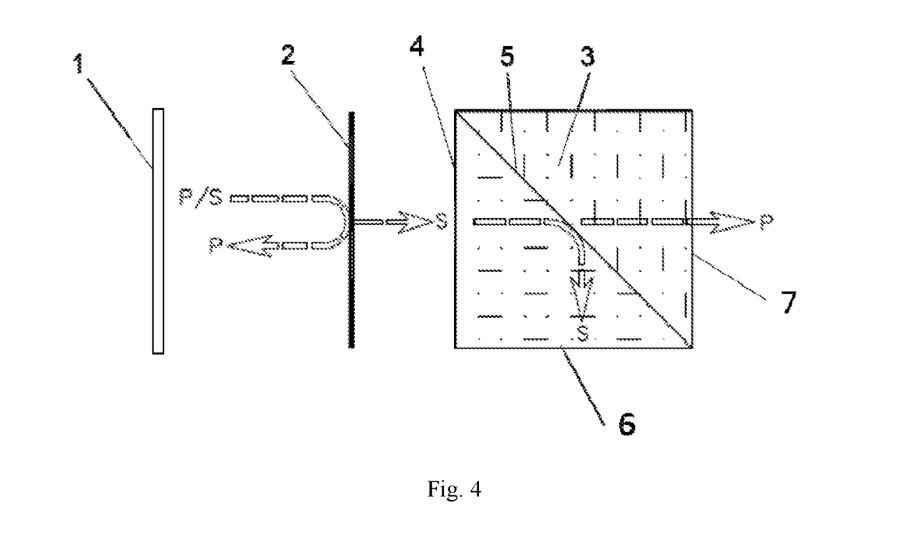
FIG. 4 is a schematic diagram of a lighting portion in the optical engine module according to a preferred embodiment of the present invention.

Specifically, in a preferred embodiment of the present invention, as shown in FIG. 4, a light splitting surface 5 and a light source array 1 are disposed on the optical engine module A, and are both included in the lighting portion of the optical engine module A. The polarized light emitted by the light source array 1 is divided by the light splitting surface 5 into a first type of polarized light transmitted to the exit surface 7 and a second type of polarized light reflected and turned 90 degrees vertically downward. The light source array 1 is disposed parallel to the optical path of the second type of polarized light reflected by the light splitting surface.

The first type of polarized light may be S polarized light, the second type of polarized light is P polarized light, and the light splitting surface 5 is used to transmit the S polarized light and reflect the P polarized light.

The first type of polarized light may also be P polarized light, the second type of polarized light is S polarized light, and the light splitting surface 5 is used to transmit the P polarized light and reflect the S polarized light.

For ease of understanding, it is unified below that the first type of polarized light is P polarized light and the second type of polarized light is S polarized light, that is, the light splitting surface can transmit the P polarized light and reflect the S polarized light.

In a preferred embodiment of the present invention, the light source array 1 is a light source (for example, a laser light source or an LED light source) capable of emitting polarized light.

In another embodiment of the present invention, as shown in FIG. 4, the light source array 1 is a non-polarized light emitter (that is, the light source array 1 emits natural light);

Then a linear polarizer 2 is disposed between the light source array 1 and the light splitting surface 5 to convert the light emitted by the light source array 1 into polarized light.

Further, as shown in FIG. 4, an incident surface 4 (also included in the lighting portion) is provided in the optical engine module A, and the incident surface 4 is disposed between the light source array 1 and the light splitting surface 5 and is parallel to the light source array 1.

An air gap may be reserved between the light source array 1 and the incident surface 4.

In a preferred embodiment of the present invention, when the light source array 1 is a polarized light source array (for example, a laser light source or a part of an LED light source), any optical element may not be provided in the air gap.

In another preferred embodiment of the present invention, when the light source array 1 is a non-polarized light source (that is, the light source array 1 emits natural light), a Linear Polarizer (LP) 2 needs to be disposed in the air gap to convert non-polarized light into polarized light, and then the polarized light is emitted to the light splitting surface 5.

Further, in a preferred embodiment of the present invention, the light source array 1 (including the linear polarizer 2 that may be provided) may be attached to the incident surface 4 through a mechanical housing (not shown in the figure), thereby realizing compact setting of the entire optical engine module A, and improving the stability of the entire system. The size of the mechanical housing may match the size of the light source array 1, and details are not described herein again.

FIG. 4 shows an example that the linear polarizer 2 is provided in the optical engine module A.

Figure 5:
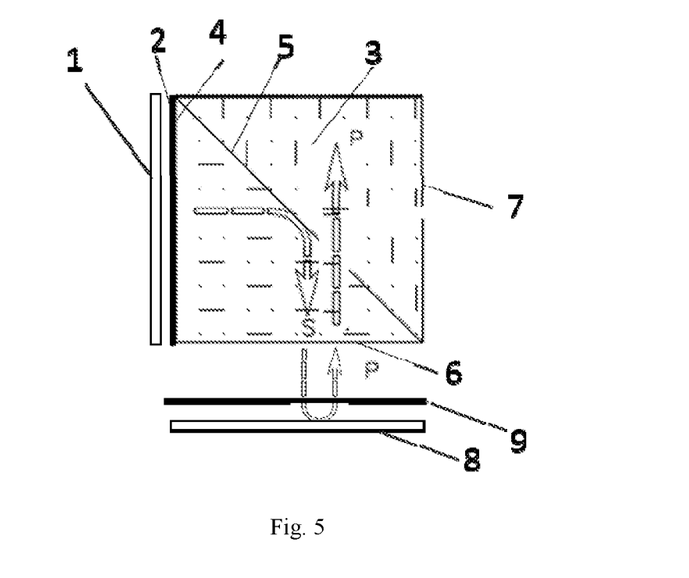
FIG. 5 is a schematic diagram of a display portion in the optical engine module according to a preferred embodiment of the present invention.

In a preferred embodiment of the present invention, as shown in FIG. 5, the optical engine module A further includes:

a micro display 8 disposed perpendicular to the light path of the second type of polarized light (S polarized light in this embodiment) reflected by the light splitting surface 5, the light emitted from the light source array 1 being reflected by the light splitting surface 5 and then imaged and displayed on the micro display 8;

The micro display 8 is also used to reflect the second type of polarized light and then convert the same into the first type of polarized light (P polarized light in this embodiment), and to transmit the first type of polarized light through the light splitting surface 5.

All parts described are included in the display portion of the optical engine module A.

In this embodiment, the micro display 8 may be selected from an optical display form, such as a Liquid Crystal Display (LCD), a Liquid Crystal on Silicon (LCOS) display, a Digital Micromirror Device (DMD), a Micro-Electro-Mechanical System (MEMS) scanner, or a touch optical fiber bundle. The LCOS display as an example is a small reflective active matrix liquid crystal display formed by using a liquid crystal layer on the top of a silicon backplane, and is a novel display technology organically combining an LCD and a Complementary Metal Oxide Semiconductor (CMOS) integrated circuit. In the LCOS display, a CMOS control chip is used to control the voltage on a square reflective aluminum electrode below the surface of the chip, and each COMS control chip is used to control a pixel.

Specifically, in a preferred embodiment of the present invention, the micro display 8 may be some micro displays capable of rotating the polarization of reflected light (for example, converting S polarized light into P polarized light), for example, some LCOS displays.

In another preferred embodiment of the present invention, the micro display 8 may also be some micro displays that cannot rotate the polarization of reflected light;

Then in this embodiment, a first quarter-wave plate 9 is disposed between the micro display 8 and the light splitting surface 5. The first quarter-wave plate is a Quarter-Wave Plate (QWP). The first quarter-wave plate 9 plays a role in making up the defect that the micro display 8 cannot rotate the polarization of reflected light, and achieves the function of rotating the polarization of reflected light.

FIG. 5 shows an example that the first quarter-wave plate 9 is provided in the optical engine module A.

In a preferred embodiment of the present invention, as shown in FIG. 5, a first reflective surface 6 is further provided in the optical engine module A, and the first reflective surface 6 is disposed between the micro display 8 and the light splitting surface 5 and is parallel to the micro display 8;

Then, the micro display 8 (including the first quarter-wave plate 9 that may be provided) may be attached to the first reflective surface 6 through a mechanical housing (not shown in the figure).

Specifically, the micro display 8 (including the first quarter-wave plate 9 that may be provided) and the first reflective surface 6 may be wrapped together by the mechanical housing adapted to the size of the micro display 8 to further enhance the compactness and stability of the imaging display system.

In a preferred embodiment of the present invention, the optical engine module A further includes:

a collimating lens 11 disposed perpendicular to the optical path of the second type of polarized light (S polarized light in this embodiment) reflected by the light splitting surface 5 and located on two sides of the light splitting surface 5 together with the micro display 8, the collimating lens 11 being used to stretch the imaging distance of pixels on the micro display 8; and a second quarter-wave plate 13 disposed between the collimating lens 11 and the light splitting surface 5 for rotating the polarization of reflected light.

All parts described are included in the imaging portion of the optical engine module A.

Specifically, in this embodiment, the second quarter-wave plate (QWP) 13 plays the same role as the first quarter-wave plate 9 in rotating the polarization of reflected light, that is, converting S polarized light into P polarized light, or converting P polarized light into S polarized light. In this embodiment, since the P polarized light is transmitted through the light splitting surface 5, the second quarter-wave plate 13 converts the P polarized light into S polarized light and emits the S polarized light to the light splitting surface 5.

In this embodiment, a second reflective surface 10 is provided between the second quarter-wave plate 13 and the light splitting surface 5.

The back surface of the collimating lens 11 may be coated with a metal or a dielectric material to create a reflector surface 12, and the curvature of the reflector surface 12 is related to the distance between the second reflective surface 10 and the first reflective surface 6, so that the focal length of the reflector surface 12 is made equal to the optical path distance from the micro display 8.

Further, in a preferred embodiment of the present invention, the collimating lens 11 (including the second quarter-wave plate 13 disposed therebetween) is attached to the second reflective surface 10 through a mechanical housing to enhance the compactness and stability of the imaging display system.

In a preferred embodiment of the present invention, the polarization beam splitter 3 in the polarizing light splitting module A mainly plays a role in splitting incident light into two types of polarized light, and the polarized light is emitted from the exit surface of the optical engine module.

As shown in FIG. 4-7, the polarization beam splitter 3 may be formed by a combination of a first right-angle prism and a second right-angle prism;

The first right-angle prism includes an incident surface 4 and a first reflective surface 6 perpendicular to each other;

The second right-angle prism includes a second reflective surface 10 and an exit surface 7 perpendicular to each other;

The first right-angle prism is below the second right-angle prism; The oblique surface of the first right-angle prism and the oblique surface of the second right-angle prism are bonded to form the light splitting surface 5;

The light splitting surface 5 is used to transmit a first type of polarized light in the light source, and to reflect a second type of polarized light in the light source. Specifically, the first type of polarized light is S polarized light, and the second type of polarized light is P polarized light; or the first type of polarized light is P polarized light, and the second type of polarized light is S polarized light. This embodiment is described by an example that the first type of polarized light is P polarized light, and the second type of polarized light is S polarized light.

Specifically, as shown in FIGS. 4-7, the polarization beam splitter 3 includes a first right-angle prism composed of a light splitting surface 5, an incident surface 3 and a first reflective surface 6, and a second right-angle prism composed of a light splitting surface 5, a second reflective surface 10 and an exit surface 7. The polarization beam splitter 3 may be set in a shape similar to a Polarization Beam Splitter (PBS) in the prior art. The polarization beam splitter is capable of splitting incident non-polarized light into two beams of vertical linearly polarized light.

The first right-angle prism is below the second right-angle prism. The polarization beam splitter is in the center of the entire optical engine module A, a light source array 1 (and a linear polarizer 2 that may be provided) is attached to the incident surface 3, a micro display 8 (and a first quarter-wave plate 9 that may be provided) is attached to the first reflective surface 6, a collimating lens 11 and a second quarter-wave plate 13 disposed therebetween are attached to the second reflective surface 10, and a tubular waveguide structure 14 is connected to the exit surface 7, thus constituting the entire compact imaging display system.

As shown in FIGS. 4-7, the light emitted from the light source array 1 passes through the light splitting surface 5 of the polarization beam splitter 3, where the S polarized light is reflected to the first reflective surface 6 below, and the P polarized light is transmitted to the exit surface 7 by the light splitting surface 5.

The polarization of the reflected S polarized light is changed by the rotation of the micro display 8 (or the first quarter-wave plate 9), the S polarized light becomes P polarized light, and the P polarized light is then transmitted to the second reflective surface 10 by the light splitting surface 5.

The polarization of the P polarized light transmitted to the second reflective surface 10 is changed by the rotation of the collimating lens 11 and the second quarter-wave plate 13, the P polarized light becomes S polarized light, and the S polarized light is then reflected to the exit surface 7 by the light splitting surface 5.

Finally, the light passing through the exit surface 7 becomes two polarized light components, which are respectively weak P polarized light (as shown in FIG. 4) and dominant S polarized light (as shown in FIG. 6). The two polarized light components are then emitted through the exit surface 7 into the waveguide structure 14 connected thereto and undergo total internal reflection, thereby improving the FOV and EMB of the entire imaging display system.

Based on the above, in the technical solution of the present invention, the optical engine module A is provided with a light source array 1, a micro display 8, a collimating lens 11 and corresponding optical accessories, these optical components are compactly packaged around a polarizer 3 by using a mechanical housing, and the optical engine module together with the waveguide structure forms a compact imaging display system, so that the stability of the imaging display system is improved, and the imaging display system is easier to apply in HMD or NED and presents a user better AR display effect.

Figure 7:
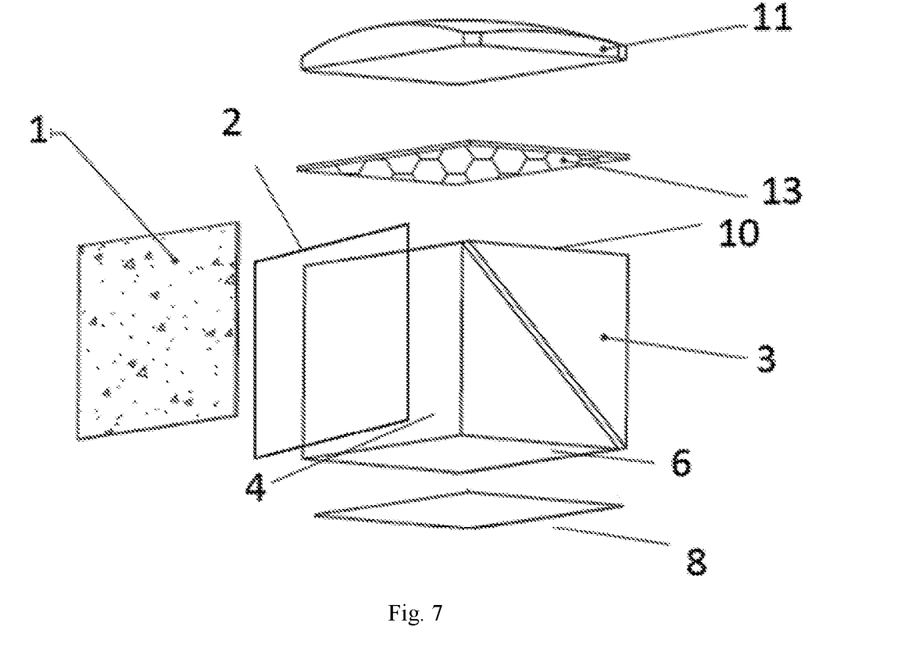
FIG. 7 is a three-dimensional schematic diagram of the optical engine module in the imaging display system according to a preferred embodiment of the present invention.

FIG. 7 is a three-dimensional schematic diagram of the optical engine module A. In FIG. 7, the connecting relationship between the central polarization beam splitter 3 and the surrounding optical components can be seen more clearly.

The polarization beam splitter 3 shown in FIGS. 4 to 7 has a similar cubic structure, which is only an embodiment of the present invention. In other embodiments of the present invention, the appearance structure of the polarization beam splitter 3 is not limited to the cubic structure, any polarization beam splitter that can meet the requirements of optical path transmission can be used as the polarization beam splitter 3, and details are not described herein again.

Based on the above, by using the imaging display system with a waveguide structure in the technical solution of the present invention, the fields of view of HMD and NED can be expanded to more than 40°, and the eye motion box of the micro display can be expanded to more than 10 mm, so that the viewer feels more comfortable and different display effects in AR technology can be achieved.

Moreover, in the technical solution of the present invention, all optical components are bonded and laminated on the central polarization beam splitter, so that the entire imaging display system is mechanically packaged more easily, and is more suitable for mass production compared with the display systems of other HMD and NED.

The above descriptions are merely preferred embodiments of the present invention, and do not therefore limit the implementation and protection scope of the present invention. Those skilled in the art should realize that all solutions obtained by equivalent substitutions and obvious changes made by using the Description and the drawings shall be included in the protection scope of the present invention.

The invention claimed is:

1. An imaging display system, applied to augmented reality technology, wherein the imaging display system is provided with an optical engine module comprising a polarization beam splitter for splitting incident light into two types of polarized light and simultaneously emitting the polarized light from an exit surface of the optical engine module;

a waveguide structure is disposed on an outer surface of the exit surface of the optical engine module, the waveguide structure is tubular, one end of the waveguide structure is connected to the exit surface and together with the exit surface forms a preset angle, the other end of the waveguide structure is a free end, and the imaging display system diffuses an eye motion box of the imaging display system through the waveguide structure;

the preset angle formed between the waveguide structure and the exit surface causes the light incident on the waveguide structure to undergo total internal reflection inside the waveguide structure;

the waveguide structure further comprises:

a plurality of semi-transmissive and semi-reflective lenses disposed obliquely in order inside the waveguide structure, the light incident into the waveguide structure being reflected on the surface of each of the lenses such that the light is uniformly released into viewer's eyes wherein the polarization beam splitter in the optical engine module is used to split incident light into two types of polarized light and emit the polarized light from the exit surface of the optical engine module;

the polarization beam splitter is formed by a combination of a first right-angle prism and a second right-angle prism;

the first right-angle prism comprises an incident surface and a first reflective surface perpendicular to each other;

the second right-angle prism comprises a second reflective surface and the exit surface perpendicular to each other;

the first right-angle prism is adjacent to the second right-angle prism;

the oblique surface of the first right-angle prism and the oblique surface of the second right-angle prism are bonded to form a light splitting surface;

the light splitting surface is used to transmit a first type of polarized light in the light source, and to reflect a second type of polarized light in the light source, the polarization beam splitter is positioned at a center of the optical engine module, a light source array is positioned adjacent to the incident surface, a micro display is disposed at the first reflective surface, a collimating lens is attached to the second reflective surface, and the exit surface is attached to the waveguide structure.

2. The imaging display system according to claim 1, wherein the two types of polarized light comprise S polarized light and P polarized light.

3. The imaging display system according to claim 1, wherein the angle between the waveguide structure and the exit surface causes the light emitted from the exit surface to reach a top surface and a bottom surface of the waveguide structure at angles greater than a critical angle;

a triangular prism is disposed between the waveguide structure and the exit surface, and the shape of the triangular prism matches the preset angle between the waveguide structure and the exit surface;

an outer surface of the triangular prism is coated with a light-absorbing material.

4. The imaging display system according to claim 3, wherein an entrance pupil of light emitted from the exit surface and incident into the waveguide structure is completely comprised in the waveguide structure.

5. The imaging display system according to claim 1, wherein a triangular prism is disposed between the waveguide structure and the exit surface, and the shape of the triangular prism matches the angle between the waveguide structure and the exit surface;

an outer surface of the triangular prism is coated with a reflective material;

the angle between the waveguide structure and the exit surface causes the light reflected from the outer surface of the triangular prism into the waveguide structure to reach the top surface and the bottom surface of the waveguide structure at angles greater than the critical angle, respectively.

6. The imaging display system according to claim 5, wherein an entrance pupil of light emitted from the exit surface and incident into the waveguide structure is comprised in the triangular prism.

7. The imaging display system according to claim 1, wherein a lighting portion of the optical engine module comprises a light splitting surface and the light source array, and the light splitting surface is disposed obliquely relative to the light source array;

a first type of polarized light in the polarized light emitted from the light source array is transmitted through the light splitting surface and emitted from the exit surface of the optical engine module;

a second type of polarized light in the polarized light emitted from the light source array is reflected 90 degrees by the light splitting surface and emitted;

the light source array is disposed parallel to the optical path of the second type of polarized light reflected by the light splitting surface;

the first type of polarized light is S polarized light, and the second type of polarized light is P polarized light; or the first type of polarized light is P polarized light, and the second type of polarized light is S polarized light.

8. The imaging display system according to claim 7, wherein the light source array is a polarized light emitter.

9. The imaging display system according to claim 7, wherein the light source array is a non-polarized light emitter;

a linear polarizer is disposed between the light source array and the light splitting surface to convert the light emitted by the light source array into polarized light.

10. The imaging display system according to claim 7, wherein an incident surface is further provided in the lighting portion, and the incident surface is disposed between the light source array and the light splitting surface and is parallel to the light source array;

the light source array is attached to the incident surface through a mechanical housing.

11. The imaging display system according to claim 7, wherein:

the micro display of the optical engine module is disposed perpendicular to the light path of the second type of polarized light reflected by the light splitting surface, the light emitted from the light source array being reflected by the light splitting surface and then imaged and displayed on the micro display;

the micro display is also used to reflect the second type of polarized light and then convert the same into the first type of polarized light, and to transmit the first type of polarized light through the light splitting surface.

12. The imaging display system according to claim 11, wherein the micro display is a display capable of rotating the polarization of reflected light.

13. The imaging display system according to claim 11, wherein the micro display is a display that cannot rotate the polarization of reflected light;

a first quarter-wave plate is disposed between the micro display and the light splitting surface for rotating the polarization of reflected light.

14. The imaging display system according to claim 11, wherein a first reflective surface is provided in the optical engine module, and the first reflective surface is disposed between the micro display and the light splitting surface and is parallel to the micro display;

the micro display is attached to the first reflective surface through a mechanical housing.

15. The imaging display system according to claim 11, wherein:

the collimating lens is disposed perpendicular to the optical path of the second type of polarized light reflected by the light splitting surface and located on two sides of the light splitting surface together with the micro display, the collimating lens being used to stretch the imaging distance of pixels on the micro display; and a second quarter-wave plate disposed between the collimating lens and the light splitting surface for rotating the polarization of reflected light.

16. The imaging display system according to claim 15, wherein a second reflective surface is provided between the second quarter-wave plate and the light splitting surface;

the collimating lens and the second quarter-wave plate are attached to the second reflective surface through a mechanical housing.

* * * * *